Patented Apr. 24, 1928.

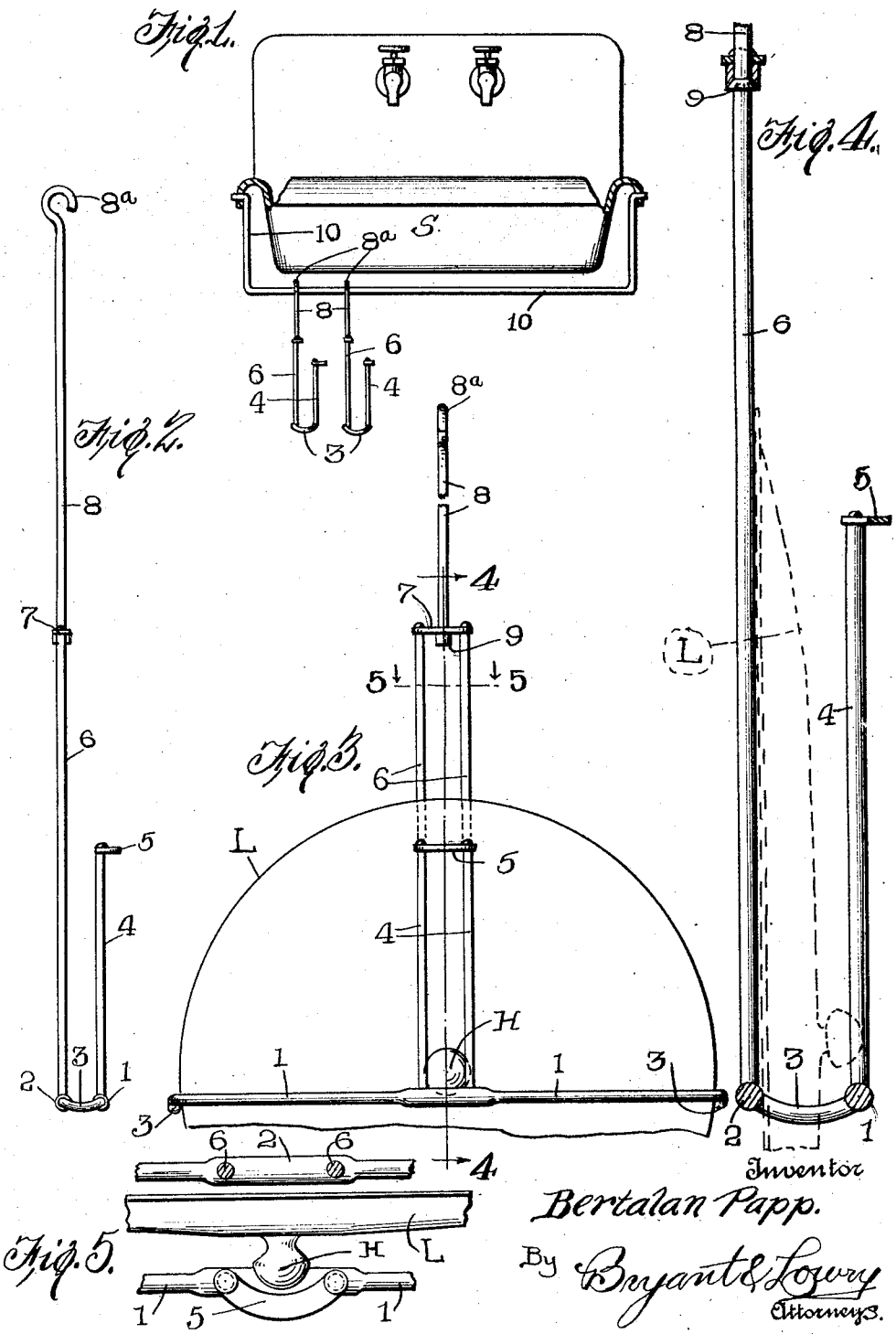

1,667,266

UNITED STATES PATENT OFFICE.

BERTALAN PAPP, OF BETHLEHEM, PENNSYLVANIA.

PAN-LID HOLDER.

Application filed July 23, 1926. Serial No. 124,477.

This invention relates to certain new and useful improvements in pan lid holders of the type for supporting a pan lid that is used as a cover for a cooking vessel or other culinary member and has for its primary object to provide a skeleton frame embodying a loop portion that is engaged by the peripheral edge of the pan lid.

A further object of the invention is to provide a pan lid holder of the above type wherein the lid supporting holder frame is swivelly suspended from a hanger rod with the holder frame constructed to provide a clearance passage for the usual center knob or handle carried by the pan lid.

With the above and other general objects in view that will become apparent as the nature of the invention is better understood, the same consists in the novel form, combination and arrangement of parts hereinafter more fully described, shown in the accompanying drawing and claimed.

In the accompanying drawing, wherein like reference numerals are employed to indicate corresponding parts throughout the several views, Figure 1 shows side elevational view of two pan lid holders supported in parallel relation upon a hanger rod that is attached to the edge flange of a kitchen sink;

Figure 2 is a side elevational view of the pan lid holder;

Figure 3 is a front elevational view of the holder with a pan lid that is fragmentarily illustrated supported therein;

Figure 4 is a vertical cross sectional view taken on line 4—4 of Figure 3; and

Figure 5 is a horizontal sectional view taken on line 5—5 of Figure 3.

The pan lid holder comprises a skeleton frame having a loop at the lower end thereof formed of front and rear parallel rods 1 and 2 that are connected at their ends by downwardly curved end rods 3, the side and end rods being spaced apart a distance sufficient to receive the pan lid L with the peripheral edge of the lid engaging the end rods 3 to be supported therein as shown in Figure 3.

Pairs of perpendicular guide rods carried by the lower rods 1 and 2 limit tilting movements of the lid L as shown by dotted lines in Figure 4, the guide rods 4 projecting upwardly from the rod 1 having their spaced upper ends connected by an outwardly curved head 5 providing a clearance for the passage of the knob or handle H carried centrally of the lid L, this construction being clearly shown in Figure 5.

The guide rods 6 carried by the rod 2 extend upwardly above the upper ends of the guide rods 4 and are connected at their upper ends by the cross head 7. The lid L is placed between the guide rods 4 and 6 with the peripheral edge thereof resting upon the end rods 3 of the lower supporting frame with the lid securely retained in position against accidental displacement.

A hanger rod 8 has a swiveled connection 9 at its lower end with the cross head 7 whereby the lid supporting frame may be rotated upon the lower end of the hanger rod 8 to facilitate use of the device.

The upper end of the hanger rod 8 carries a hook 8ª that may be suspended from any convenient support and one manner of suspending the holder is illustrated in Figure 1 wherein the bracket rod 10 disposed beneath the sink S has the ends thereof supported to the upper flanged edge of the sink with the pan lid holders suspended upon the bracket rod 10 as illustrated. By positioning the bracket rod 10 outwardly of the room wall, it is possible to suspend a plurality of the pan lid holders thereon in parallel relation as shown in Figure 1 with a greater number of holders occupying a minimum space, while the swiveled connection 9 between the hanger rod 8 and the holder frame permits free rotation of the frame to gain more ready access to the lids L for removing the same from the holder.

From the above detailed description of the device, it is believed that the construction and operation thereof will at once be apparent, and while there is herein shown and described the preferred embodiment of the present invention it is nevertheless to be understood, that minor changes may be made therein without departing from the spirit and scope of the invention as claimed.

Having thus described my invention, I claim:—

1. In a pan lid holder, a skeleton frame comprising a horizontal loop having parallel side rods and connecting end rods, a pair of perpendicular guide rods carried by each side rod intermediate the ends thereof with one pair of guide rods longer than the other pair, a hanger rod swiveled to the upper ends of the longer pair of guide rods, and an outwardly arched cross-head at the upper ends of the shorter pair of guide rods to provide a clearance passage for a lid handle.

2. In a pan lid holder, a skeleton frame comprising a horizontal loop having parallel side rods and connecting end rods, a pair of perpendicular guide rods carried by each side rod intermediate the ends thereof with one pair of guide rods longer than the other pair, a cross-head at the upper ends of the longer pair of guide rods, a longer rod swiveled at its lower end to said cross-head, and an outwardly arched cross-head at the upper ends of the shorter pair of guide rods to provide a clearance passage for a lid handle.

In testimony whereof I affix my signature.

BERTALAN PAPP.